(12) United States Patent
Rao et al.

(10) Patent No.: US 9,767,439 B2
(45) Date of Patent: Sep. 19, 2017

(54) AUTOMATIC DRAFT EMAIL NOTIFICATION

(71) Applicant: YAHOO! INC., Sunnyvale, CA (US)

(72) Inventors: Supreeth Rao, Sunnyvale, CA (US); Utkarsh Shrivastava, San Jose, CA (US); Sudharsan Vasudevan, Sunnyvale, CA (US)

(73) Assignee: Yahoo Holdings Inc., Sunnyvale, CA (US)

( * ) Notice: Subject to any disclaimer, the term of this patent is extended or adjusted under 35 U.S.C. 154(b) by 488 days.

(21) Appl. No.: 14/088,525

(22) Filed: Nov. 25, 2013

(65) Prior Publication Data

US 2015/0149502 A1 May 28, 2015

(51) Int. Cl.
*G06F 17/30* (2006.01)
*G06Q 10/10* (2012.01)

(52) U.S. Cl.
CPC ................ *G06Q 10/107* (2013.01)

(58) Field of Classification Search
CPC .................................................. G06Q 10/107
USPC ........................................................ 707/770
See application file for complete search history.

(56) References Cited

U.S. PATENT DOCUMENTS

| | | | | | |
|---|---|---|---|---|---|
| 2002/0099775 | A1* | 7/2002 | Gupta | .................. | G06Q 10/107 709/205 |
| 2004/0199598 | A1* | 10/2004 | Kalfas | .................. | G06Q 10/107 709/207 |
| 2008/0155035 | A1* | 6/2008 | Reddy | .................. | G06Q 10/107 709/206 |
| 2009/0055481 | A1* | 2/2009 | Carmel | ................. | G06Q 10/107 709/206 |
| 2009/0204680 | A1* | 8/2009 | Kirkpatrick | ........... | H04L 12/587 709/206 |
| 2010/0070844 | A1* | 3/2010 | Aymeloglu | ......... | G06F 17/2288 715/229 |
| 2010/0088387 | A1* | 4/2010 | Calamera | .............. | H04L 12/587 709/207 |
| 2010/0131523 | A1* | 5/2010 | Yu | ......................... | G06Q 10/107 707/756 |
| 2011/0163970 | A1* | 7/2011 | Lemay | ................ | G06F 3/04883 345/173 |
| 2011/0215923 | A1* | 9/2011 | Karim | .................. | G08B 25/006 340/540 |
| 2013/0205246 | A1* | 8/2013 | Schmidt | .............. | G06F 17/2235 715/781 |
| 2013/0227034 | A1* | 8/2013 | Jiang | ..................... | H04L 51/043 709/206 |
| 2013/0318176 | A1* | 11/2013 | Claux | .................. | G06Q 10/107 709/206 |
| 2014/0033088 | A1* | 1/2014 | Shaver | .................. | G06F 17/212 715/764 |

(Continued)

*Primary Examiner* — Kim Nguyen
*Assistant Examiner* — Tiffany Bui
(74) *Attorney, Agent, or Firm* — Cooper Legal Group, LLC

(57) ABSTRACT

A system and method for automatic draft email notification includes the following steps or acts performed while a user is engaged with a first email in an active email session: retrieving a value from the first email to use as a search term; accessing draft emails associated with the user; determining if the search term from the first email matches a corresponding string in the draft emails associated with the user; and presenting the draft emails that match the search term as a listing of selectable draft emails.

20 Claims, 7 Drawing Sheets

(56) References Cited

U.S. PATENT DOCUMENTS

2014/0095973 A1* 4/2014 Chu .................... G06F 17/2288
                                                        715/229
2014/0280615 A1* 9/2014 Burlin .................... H04L 51/22
                                                        709/206

* cited by examiner

400

```
┌─────────────────────────────────────┐
│ emailuser1 receives an email message from │
│ emailuser2.                         │
│ 402                                 │
└─────────────────────────────────────┘
                  │
                  ▼
┌─────────────────────────────────────┐
│ Retrieve emailuser2's ID while in viewing pane. │
│ 404                                 │
└─────────────────────────────────────┘
                  │
                  ▼
              ╱ ID matches ╲     N
             ╱    draft?    ╲ ──────┐
             ╲     406      ╱       │
              ╲            ╱        │
                  │ Y                │
                  ▼                  │
┌─────────────────────────────────────┐  │
│ Retrieve all drafts associated with emailuser2. │  │
│ 408                                 │  │
└─────────────────────────────────────┘  │
                  │                      │
                  ▼                      │
┌─────────────────────────────────────┐  │
│ Present listing of drafts to emailuser2 in viewing │  │
│ pane.                               │  │
│ 410                                 │  │
└─────────────────────────────────────┘  │
                  │                      │
                  ▼◄─────────────────────┘
┌─────────────────────────────────────┐
│ Terminate auto-notification         │
│ 412                                 │
└─────────────────────────────────────┘
```

*FIG. 4*

AUTOMATIC DRAFT EMAIL NOTIFICATION

CROSS-REFERENCE TO RELATED APPLICATIONS

None.

FIELD OF THE INVENTION

The invention disclosed broadly relates to the field of email messaging, and more particularly relates to the field of draft email notification.

BACKGROUND OF THE INVENTION

When composing an email message, the message in progress is automatically saved to the composer's draft mail folder when the system detects no activity for a period of time (usually a couple of minutes). In addition, the composer has the option to explicitly save the email message into the draft folder. The composer can then retrieve the saved draft from the draft folder and finish the message. This is how most messaging systems are set up.

However, because the unfinished messages are out of sight, email users generally forget about the unfinished drafts and begin new email messages. Consequently, the draft messages proliferate in the draft folder. The user might also end up losing the context of the draft after a long period. Users tend to compose mail and then save the mail as drafts to be sent later. Seldom do they send all the drafts which were written, for an assortment of reasons, including:

1) users want certain emails to be sent out at a specific time and they subsequently forget to send; and 2) some temporary internet connection error might occur on the user's side and they are not aware that the email was saved as a draft and not sent.

SUMMARY OF THE INVENTION

Briefly, according to an embodiment of the present disclosure, a method for automatic draft email notification includes the following steps or acts performed while a user is engaged with a first email in an active email session: retrieving a value from the first email to use as a search term; accessing draft emails associated with the user; determining if the search term from the first email matches a corresponding string in the draft emails associated with the user; and presenting the draft emails that match the search term as a listing of selectable draft emails.

According to another embodiment of the present disclosure, an information processing system for automatic draft email notification includes: a user interface, a processor device operably coupled with the user interface, and a memory operably coupled with the processor device. The memory includes computer-executable instructions for performing the following steps while a user is engaged with a first email in an active email session: retrieving a value from the first email to use as a search term; accessing draft emails associated with the user; determining if the search term from the first email matches a corresponding string in the draft emails associated with the user; and presenting the draft emails that match the search term as a listing of selectable draft emails.

According to another embodiment of the present disclosure, a computer program product includes a non-transitory computer-readable storage medium with computer-executable instructions stored thereon. The computer-executable instructions, when executed, cause a computer to perform: retrieving a value from the first email to use as a search term; accessing draft emails associated with the user; determining if the search term from the first email matches a corresponding string in the draft emails associated with the user; and presenting the draft emails that match the search term as a listing of selectable draft emails.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which:

FIG. 4 is a high-level flowchart of the draft email notification method while in viewing mode, according to an embodiment of the present disclosure;

Figure 1:
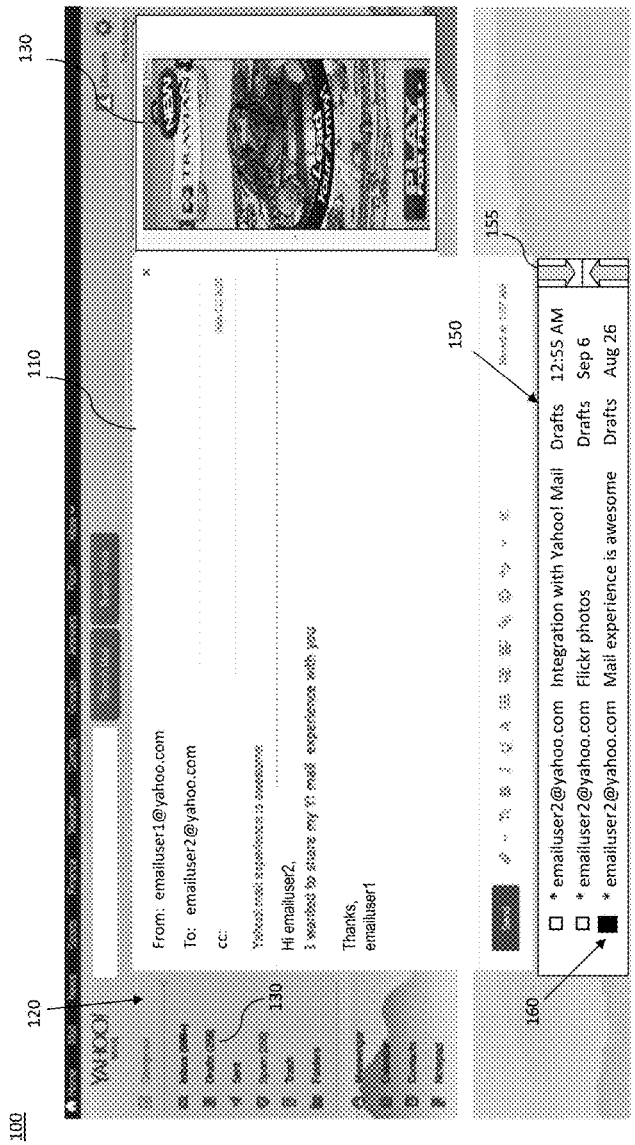
FIG. 1 is an exemplary illustration of a draft notification, according to an embodiment of the present disclosure.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present invention, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We describe an automatic email draft notification and reminder for previously composed draft email messages. The email draft notification method offers an automatic solution to the problems as mentioned in the Background section. When a user is composing a message, the draft notification method immediately checks to determine if a draft has been saved and meant for the same recipient. If a match occurs, the application alerts the user about the pending draft. This is beneficial because the stored draft might provide more context about the conversation in the current email message.

Similarly, when a user is in a 'threaded' email view, as soon as an email is received, the application detects if the user already has a draft saved which was meant for the same recipient (or at least one of multiple recipients). Again, an alert is shown to the user, providing a reminder about the saved draft. This automatic email draft notification can be advantageously implemented under the following circumstances:

a) Draft Notification based on Email ID when in Reply or Reply All Mode: when User A initiates a Reply or a Reply All to a received email message from User B, thereby opening a compose window pane, a list of previous drafts relevant to the received email message is shown in the compose pane. The relevance is determined by a search API (application program interface) searching through the draft emails for a match based on the email address for User B.

b) Draft Notification Based on Email ID when in Compose Mode: when User A is in the compose pane, composing an email to User B, a list of previous drafts to User B is shown in the compose pane. In this mode, the search API searches through User A's draft mail folder for any drafts from User A to User B. Once found, the API fetches all drafts for User B.

c) Draft Notification Based on Subject/Body when in Compose Mode: when User A is in the compose pane, composing an email to User B, a list of previous drafts matching the subject/body of the email is shown in the compose pane. In this mode, the search API searches for a string from the subject/body of the email to match with an exact string from the stored emails. Once found, the API fetches all drafts with a matching subject/body d) Draft Notification when in View Mode: when User A views an email message from User B that is associated with a draft email, the list of previous drafts from User A to User B is shown in the view email message pane. In the case of multiple user inclusion there is an option to select refining the search to retrieve drafts in which all the users are included, or at least one user is included.

e) Draft suggestion based on b) and c) combined.

In all the above cases, when the user clicks on a draft suggestion, thereby selecting that draft email, the email screen is updated with the selected draft email. The user can then continue the email session, edit the draft email, and send. Once the message is sent, the draft will be deleted automatically from the draft folder.

Referring now in specific detail to the drawings, and particularly to FIG. 1, there is provided a simplified pictorial illustration of an e-mail screen 100 in which the automatic draft notification method can be implemented, according to an embodiment of the present disclosure. FIG. 1 shows a Yahoo! Mail Web browser-based e-mail application. The e-mail screen 100 shows the "compose" pane 110 for writing e-mails against a backdrop 120. Here emailuser1 is composing an e-mail message to emailuser2. Because emailuser1 has draft messages addressed to emailuser2 saved in his/her draft folder 130, the automatic draft notification presents a list of those draft messages in a bar 150 along the bottom of the screen 100.

The list of draft messages can be shown as a message list as shown the attached figure or as a separate list anywhere else on the screen 100. A scroll bar 155 can be included when the number of draft messages in the list exceeds a threshold amount. Ideally, only a few draft messages should be shown at one time so that the screen 100 is not cluttered with draft messages.

In the illustration of FIG. 1 checkboxes 160 allow emailuser1 to easily select any or all of the draft reminders from the list. In other embodiments, the draft reminders are hyper-linked and the user can select by clicking on the desired draft. In this latter embodiment the checkboxes are not necessary. It will be appreciated by those with knowledge in the art that other modes of selection are contemplated within the spirit and scope of the disclosure.

Figure 2:
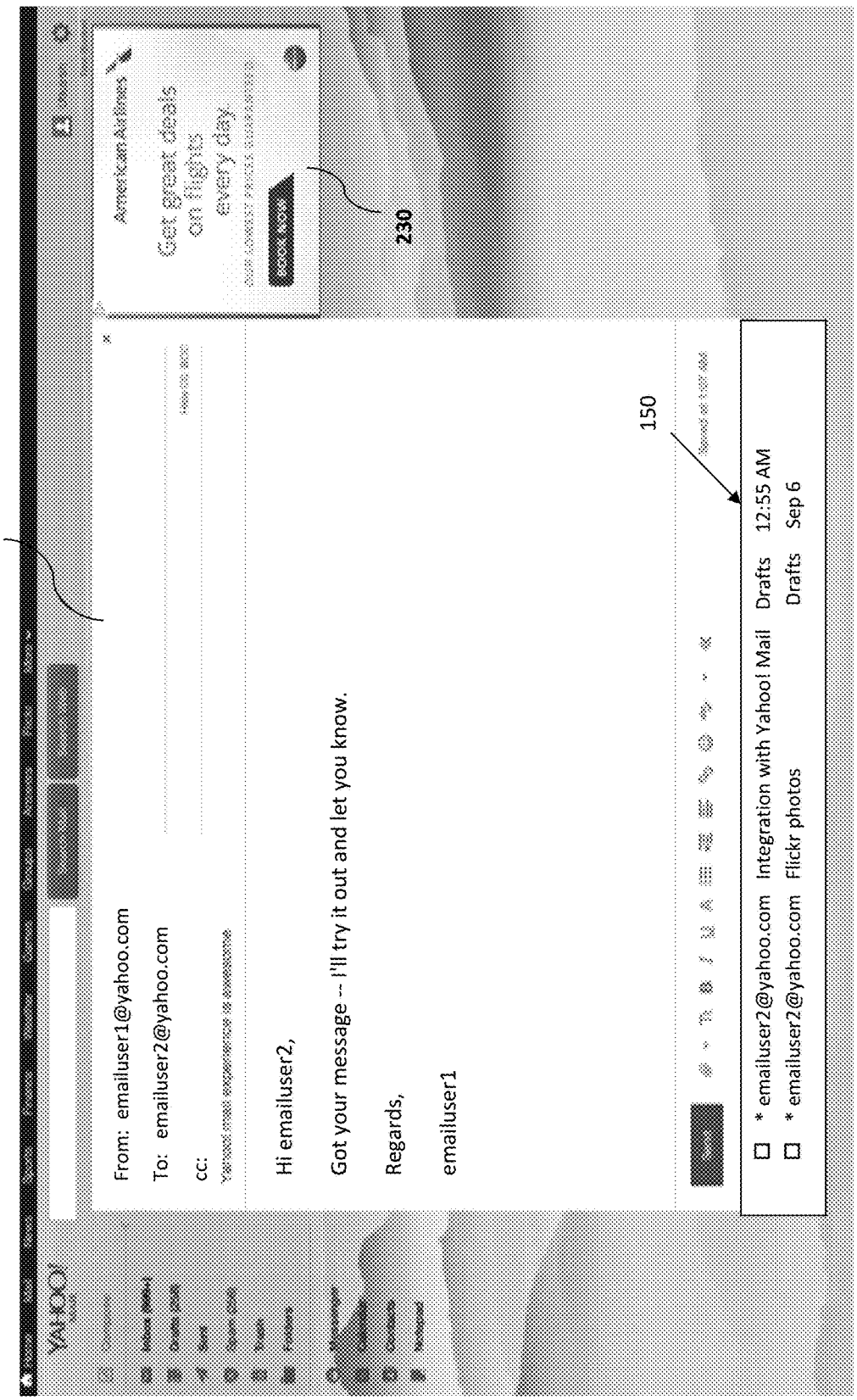
FIG. 2 is an exemplary illustration of a draft e-mail selected from the reminder pane, according to an embodiment of the present disclosure.
Figure 6:
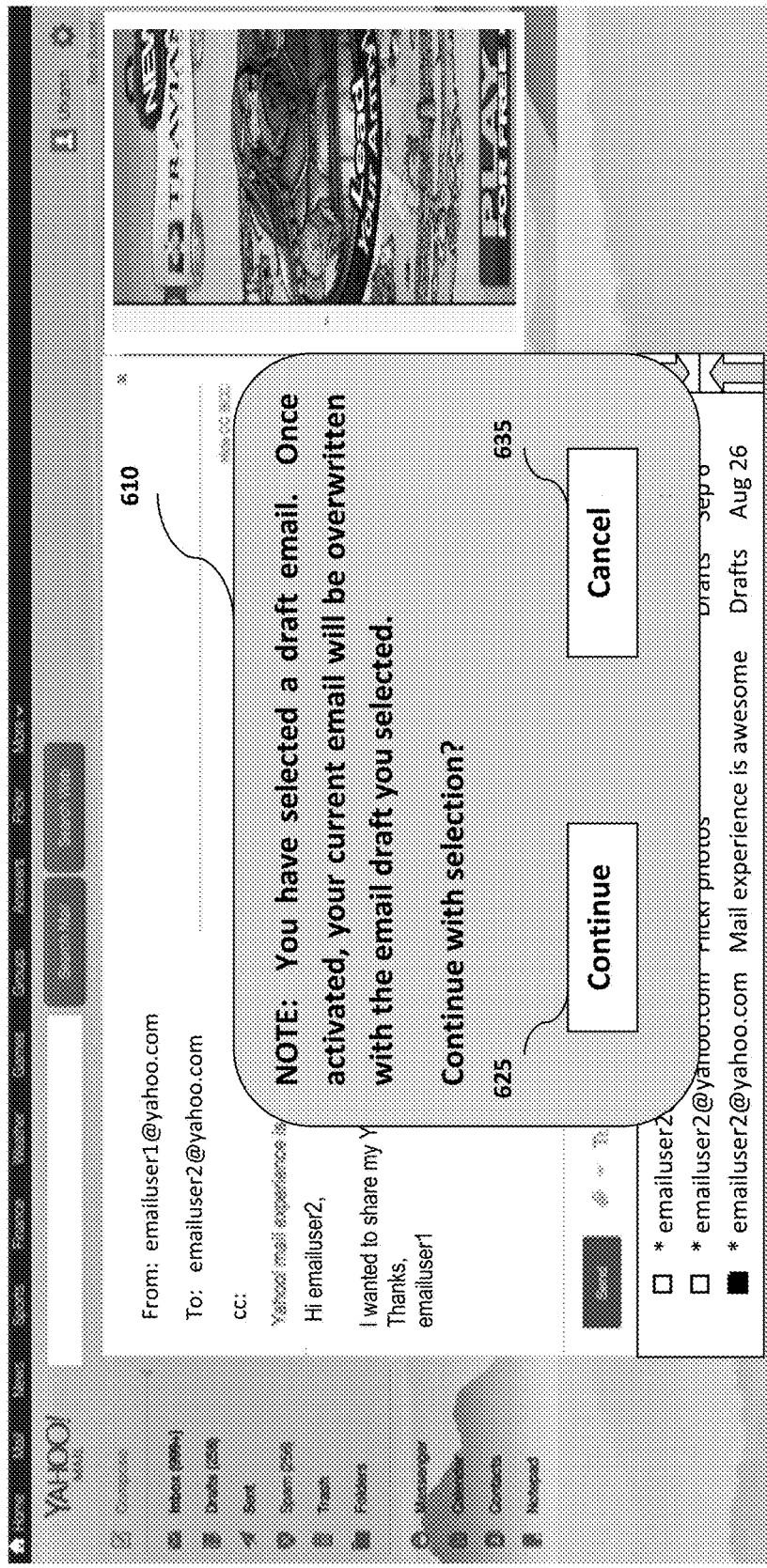
FIG. 6 is an exemplary illustration of the alert message, according to an embodiment of the present disclosure.

When user emailuser1 selects one of the saved drafts from the reminder preview bar 150, that selected draft is placed in active mode and the saved draft appears in the compose pane 110. FIG. 2 shows the result of the user's selection of a draft from the reminder preview bar 150. Screen 210 shows the previously saved draft selected by the emailuser1 in FIG. 1. Note that the preview bar 150 no longer lists this email because it has been moved from draft status to active status. When this occurs the previously active email is overwritten. Because there may exist some scenarios where emailuser1 selects the draft email 210 to read it but does not want the current email to be overwritten by the draft email 210, we provide an alert message 610 such as the one shown in FIG. 6 before proceeding.

When emailuser1 loads a draft from the message list as shown in FIG. 2, because it is a page view any advertisements (ads) served on that screen 100 can be rotated. You will note that the ad 230 served in FIG. 2 after a draft load is different than the ad 130 served in FIG. 1. The side benefit to this method generating more page views is that more ads 230 can be shown and refreshed.

Figure 3:
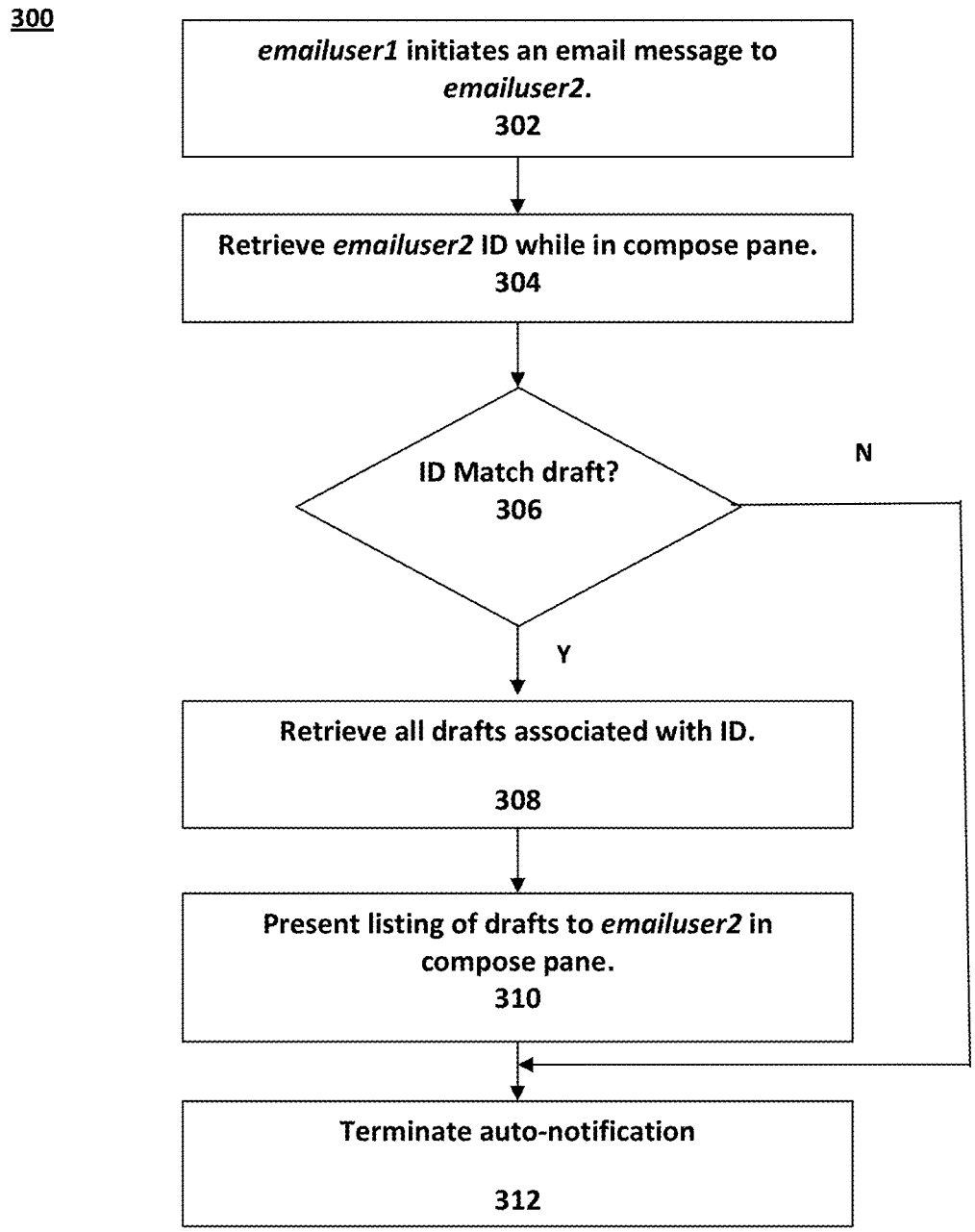
FIG. 3 is a high-level flowchart of the draft email notification method, according to an embodiment of the present disclosure.

Referring now to FIG. 3, we show a flowchart 300 of the method of draft email notification when in compose mode, according to an embodiment of the present disclosure. In step 302 emailuser1 initiates an email message to emailuser2. Once emailuser1 types in emailuser2's e-mail address in the "To" field, the draft email notification system retrieves emailuser2's email address in step 304. In decision step 306, the system will attempt to match emailuser2's name (e-mail address) with any drafts with that name in emailuser1's draft folder.

When it is determined that emailuser2's name matches a saved draft, the system retrieves all draft emails addressed to emailuser2 in step 308. In step 310 a listing of draft emails addressed to emailuser2 are presented to emailuser1 within the compose pane in step 310 and in step 312 the auto-notification process is terminated.

It should be noted that the draft email notification method can be time-sensitive, thereby ignoring any drafts that are older than a pre-defined threshold. In addition, the draft notification method can prioritize more recent drafts by listing the most recent drafts first.

FIG. 4 shows a flowchart 400 of the method for automatic draft notification while in viewing mode, according to an embodiment of the present disclosure. In step 402 emailuser1 receives an email message from emailuser2. In step 404 while in the viewing pane, the system retrieve's emailuser2's email address from the "From" field in step 404. Using the retrieved email address for emailuser2, the system will attempt to match it to a draft email in step 406. If the email address matches a saved draft, then all saved drafts addressed to emailuser2 are retrieved in step 408. In step 410 a listing of the drafts are presented to emailuser1 in the viewing pane, and in step 412 the process is terminated.

Figure 5:
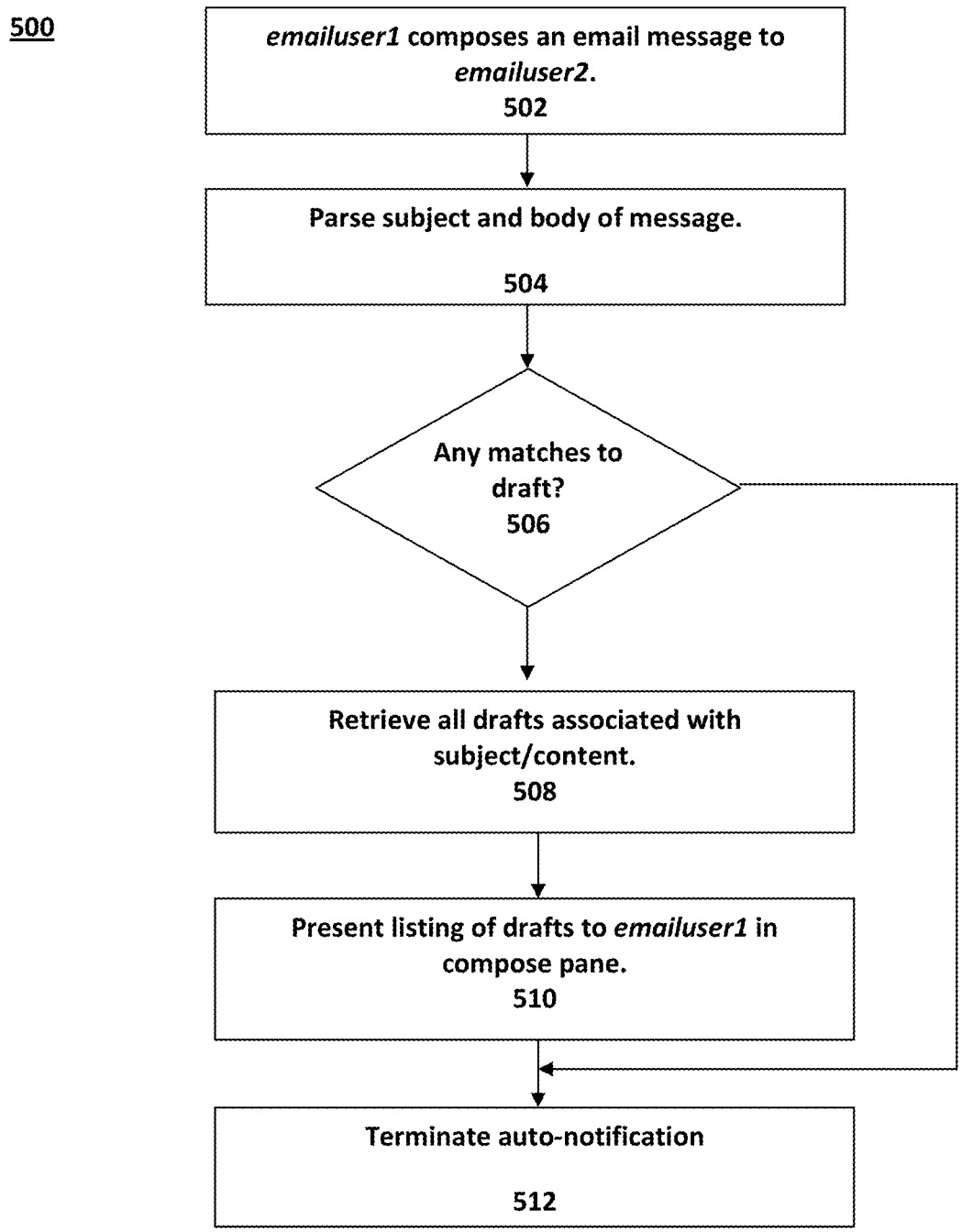
FIG. 5 is a high-level flowchart of the draft email notification method according to another embodiment of the present disclosure.

FIG. 5 shows a flowchart 500 of another embodiment of the method for automatic draft notification. In this embodiment, the system matches terms (parsed character strings) from the subject and/or content of an active e-mail to draft e-mails. Beginning at step 502, emailuser1 composes a new email message. The system parses the subject and body of the message in step 504. Next, the system will attempt to match terms from the subject and body to terms found in emailuser1's draft emails in step 506.

For this embodiment, we leverage technology from Y! mail, which provides a simple interface to search for all emails that contain a particular string. Acting as a wrapper around the search API from Y! mail, we can retrieve all drafts for the string that we parse from the current email's subject/body. For example, assume emailuser1 is composing an email and the string "Yahoo" is found in the subject and/or body while in the compose pane. We input the string "Yahoo" into the existing search API and filter all non-draft emails that result from the search. When a match is found, then all drafts associated with the subject/content are retrieved in step 508. In step 510 the matched drafts are presented to emailuser1 in the compose pane, and in step 512 the auto-notification process is terminated.

Referring again to FIG. 6, we show the original email screen 100 from FIG. 1 where emailuser1 selects a draft email to emailuser2. As stated previously, there may be circumstances where emailuser1 selects a draft email to review, but does not necessarily want the original email overwritten by the selected draft email. To address such a situation, we provide an alert message such as the dialog box 610 shown here. When emailuser1 selects an email draft, an alert message will appear notifying the email user that continuing with selection of the draft email will cause the original email to be overwritten by the draft email.

The email user will have the option to proceed with the overwriting, perhaps by an explicit choice such as the "Continue" button 625 shown here. The email user will also have the option to cancel and return to the original email, perhaps by explicitly selecting the "Cancel" button 635 as shown here. Emailuser1 can then view the draft email in the Draft folder if so desired. It will be appreciated by those with knowledge in the art that the alert message can take many forms and is not limited to the exemplary dialog box 610 provided here.

Benefits and Advantages of the Draft Email Notification Method.

Some of the many benefits and advantages to the automatic draft email notification method are:

1) providing more relevant information about the context of an email/thread with respect to previously saved drafts;

2) additional ad revenue and exposure generated by rotating ads when the email user selects a draft which otherwise would have been ignored and/or forgotten;

3) more engagement from mail users, leading to increased revenue.

Figure 7:
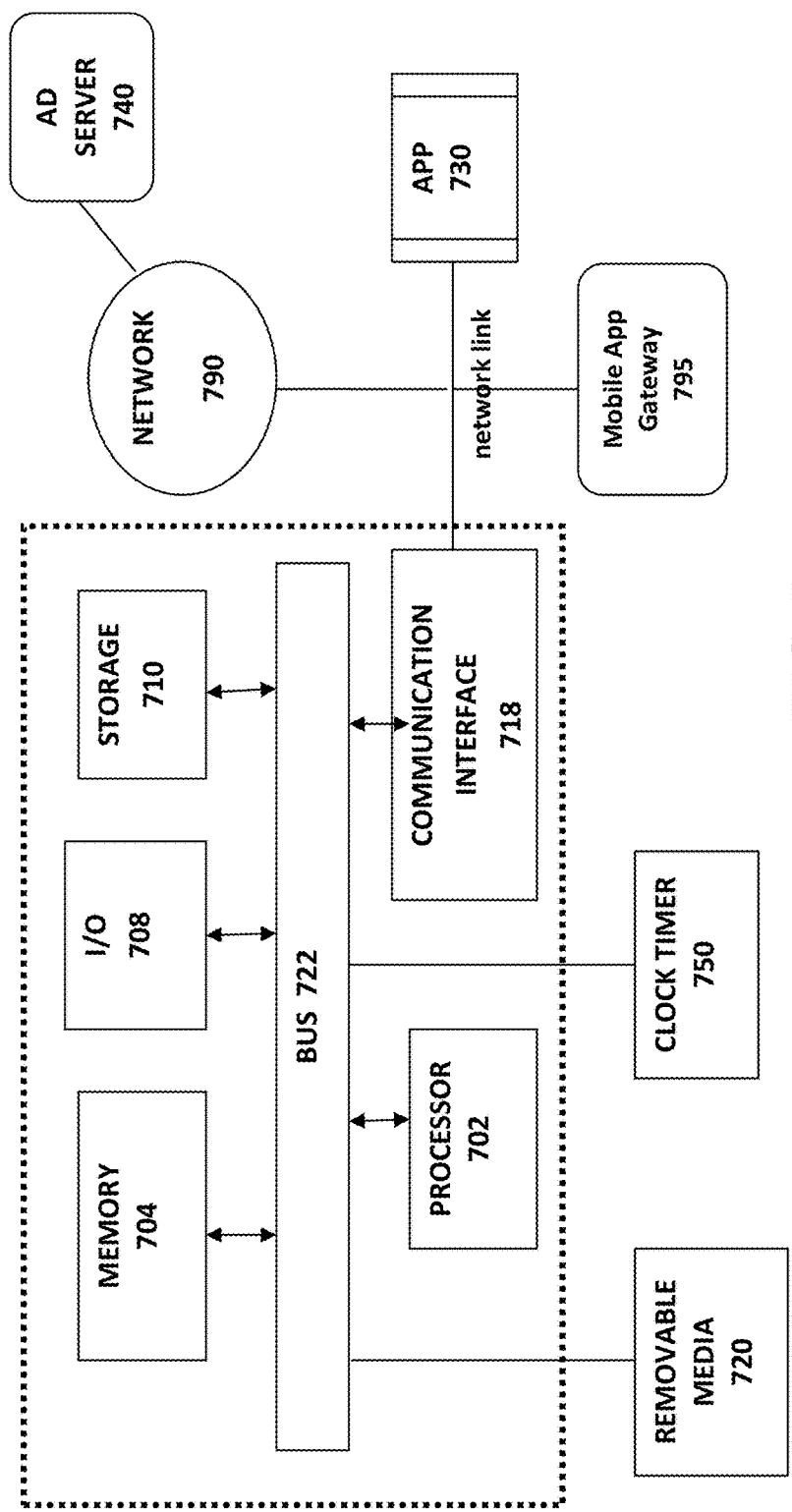
FIG. 7 is a high level block diagram showing an information processing system configured to operate according to an embodiment of the present disclosure.

FIG. 7 Hardware Embodiment.

Referring now to FIG. 7, there is provided a simplified pictorial illustration of an information processing system including the hardware components for providing automatic draft email notification, in which the present invention may be implemented. For purposes of this invention, computer system 700 may represent any type of computer, information processing system or other programmable electronic device, including a client computer, a server computer, a portable computer, a tablet computer, an embedded controller, a personal digital assistant, a mobile device, and so on. The computer system 700 may be a stand-alone device or networked into a larger system.

Computer system 700, illustrated for exemplary purposes as a networked computing device, is in communication with other networked computing devices (such as an Email App 730 and an Ad Server 740) via network 790. For mobile device applications, computer system 700 is in communication with Mobile App Gateway 795. As will be appreciated by those of ordinary skill in the art, network 790 may be embodied using conventional networking technologies and may include one or more of the following: local area networks, wide area networks, intranets, Cloud computing, public Internet and the like.

Throughout the description herein, an embodiment of the invention is illustrated with aspects of the invention embodied solely on computer system 700. As will be appreciated by those of ordinary skill in the art, aspects of the invention may be distributed amongst one or more networked computing devices which interact with computer system 700 via one or more data networks such as, for example, network 790. However, for ease of understanding, aspects of the invention have been embodied in a single computing device—computer system 700.

Computer system 700 includes, inter alia processing device 702 which communicates with an input/output subsystem 708, memory 704, storage 710 and network 790. The processor device 702 is operably coupled with a communication infrastructure 722 (e.g., a communications bus, cross-over bar, or network). The processor device 702 may be a general or special purpose microprocessor operating under control of computer program instructions executed from memory 704 on program data. The processor 702 may include a number of special purpose sub-processors such as a comparator engine, each sub-processor for executing particular portions of the computer program instructions. Each sub-processor may be a separate circuit able to operate substantially in parallel with the other sub-processors.

The memory 704 may be partitioned or otherwise mapped to reflect the boundaries of the various memory subcomponents. Memory 704 may include both volatile and persistent memory for the storage of: operational instructions for execution by CPU 702, data registers, application storage and the like. Memory 704 preferably includes a combination of random access memory (RAM), read only memory (ROM) and persistent memory such as that provided by a hard disk drive or other tangible device. The computer instructions/applications that are stored in memory 704 are executed by processor 702.

Those skilled in the art will appreciate that the functionality implemented within the blocks illustrated in the diagram may be implemented as separate components or the functionality of several or all of the blocks may be implemented within a single component. For example, the functionality for the Clock Timer 750 may be included in the same component as the Processor Device 702.

The I/O subsystem 708 may include various end user interfaces such as a display, a keyboard, and a mouse. The I/O subsystem 708 may further include a connection to a network 790 such as a local-area network (LAN) or wide-area network (WAN) such as the Internet.

The computer system 700 may also include a removable storage drive 710, representing a floppy disk drive, a magnetic tape drive, an optical disk drive, etc. The removable storage drive 710 reads from and/or writes to a removable storage unit in a manner well known to those having ordinary skill in the art. Removable storage unit, represents a floppy disk, a compact disc, magnetic tape, optical disk, CD-ROM, DVD-ROM, and the like which are read by and written to by removable storage drive 710. As will be appreciated, the removable storage unit 710 includes a non-transitory computer readable medium having stored therein computer software and/or data.

The computer system 700 may also include a communications interface 112. Communications interface 718 allows software and data to be transferred between the computer system and external devices. Examples of communications interface 718 may include a modem, a network interface (such as an Ethernet card), a communications port, a PCMCIA slot and card, etc.

In this document, the terms "computer program medium," "computer usable medium," and "computer readable medium" are used to generally refer to non-transitory media such as removable storage drive 710, or a hard disk drive. These computer program products are means for providing computer-executable instructions to the computer system 700. The computer readable medium 710 allows the computer system 700 to read data, instructions, messages or message packets, and other computer readable information from the computer readable medium 710.

Therefore, while there has been described what is presently considered to be the preferred embodiment, it will understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

We claim:

1. A method for automatic draft email notification, comprising:
    using a processor device operably coupled with a user interface, performing the following acts while a user is composing a first email in a compose pane associated with an active email session:
        retrieving a value from the first email to use as a search term;
        accessing draft emails associated with the user;
        determining if the search term from the first email matches a corresponding string in at least one of the draft emails associated with the user;
        presenting, while the compose pane is displayed, one or more of the draft emails that match the search term as a listing of selectable draft emails;
        responsive to receiving a selection of a draft email from the listing of the selectable draft emails displayed while the compose pane is displayed, presenting an alert message informing the user that activating the draft email selected by the user will cause the first email to be overwritten, the alert message comprising a first choice to proceed with activation of the draft email and a second choice to cancel activation of the draft email;
        receiving a selection of the first choice from the alert message;
        activating the draft email comprising updating the compose pane to comprise the draft email; and
        continuing to present the listing of the selectable draft emails, comprising one or more draft emails other than the draft email, after receiving the selection of the first choice and updating the compose pane to comprise the draft email.

2. The method of claim 1, wherein the listing of the selectable draft emails is adjacent to the compose pane.

3. The method of claim 1, wherein retrieving the value comprises retrieving content from at least one of a subject or a body of the first email.

4. The method of claim 1, wherein presenting one or more of the draft emails comprises displaying the selectable draft emails with checkboxes.

5. The method of claim 1, wherein the listing of the selectable draft emails comprises a plurality of selectable draft emails.

6. The method of claim 1, wherein activating the draft email comprises overwriting the first email.

7. The method of claim 1, wherein the alert message, when presented, overlaps at least some of at least one of the listing of the selectable draft emails or the compose pane.

8. An information processing system for automatic draft email notification comprising:
    a user interface;
    a processor device operably coupled with the user interface; and
    a memory operably coupled with the processor device, the memory comprising computer-executable instructions causing a computer to perform the following acts while a user is composing a first email in an active email session:
        retrieving a value from the first email to use as a search term;
        accessing draft emails associated with the user;
        determining if the search term from the first email matches a corresponding string in at least one of the draft emails associated with the user;
        presenting, while the first email is open for editing, one or more of the draft emails that match the search term as a listing of selectable draft emails;
        responsive to receiving a selection of a draft email from the listing of the selectable draft emails while the first email is open for editing, presenting an alert message informing the user that activating the draft email selected by the user will cause the first email to be overwritten, the alert message comprising a first choice to proceed with activation of the draft email and a second choice to cancel activation of the draft email;
        receiving a selection of the first choice from the alert message;
        activating the draft email; and
        continuing to present the listing of the selectable draft emails, comprising one or more draft emails other than the draft email, after receiving the selection of the first choice and activating the draft email.

9. The information processing system of claim 8, wherein retrieving the value comprises retrieving an email address from the first email.

10. The information processing system of claim 8, wherein retrieving the value comprises retrieving content from at least one of a subject or a body of the first email.

11. The information processing system of claim 8, wherein presenting one or more of the draft emails comprises displaying the selectable draft emails with checkboxes.

12. The information processing system of claim 8, wherein the listing of the selectable draft emails comprises a plurality of selectable draft emails.

13. The information processing system of claim 8, wherein activating the selected draft email comprises overwriting the first email.

14. The information processing system of claim 8, wherein the listing of the selectable draft emails is adjacent to the compose pane.

15. A computer program product comprising a non-transitory computer readable storage medium with computer-executable instructions stored thereon, the computer-executable instructions causing a computer to perform:

retrieving a value from a first email from an active email session to use as a search term;
   accessing draft emails associated with a user of the first email;
   determining if the search term from the first email matches a corresponding string in at least one of the draft emails associated with the user;
   presenting, while the first email is displayed, a listing of selectable draft emails that contain the corresponding string that matches the search term;
   responsive to receiving a selection of a draft email from the listing of the selectable draft emails while the first email is displayed, presenting an alert message informing the user that activating the draft email selected by the user will cause the first email to be overwritten, the alert message comprising a first choice to proceed with activation of the draft email and a second choice to cancel activation of the draft email;
   receiving a selection of the first choice from the alert message;
   activating the draft email; and
   continuing to present the listing of the selectable draft emails, comprising one or more draft emails other than the draft email, after receiving the selection of the first choice and activating the draft email.

16. The computer program product of claim 15, wherein retrieving the value comprises retrieving at least one of:
   an email address from the first email,
   first content from a subject of the first email, or
   second content from a body of the first email.

17. The computer program product of claim 15, wherein the listing of the selectable draft emails comprises a plurality of selectable draft emails.

18. The computer program product of claim 15, wherein activating the draft email comprises overwriting the first email.

19. The computer program product of claim 15, wherein the activating the draft email comprises updating the compose pane to comprise the draft email.

20. The computer program product of claim 15, wherein presenting the listing of the selectable matching draft emails comprises displaying the selectable matching draft emails with checkboxes.

* * * * *